United States Patent [19]

Santilli et al.

[11] 4,414,152
[45] Nov. 8, 1983

[54] BIS ARYL-AZO DERIVATIVES OF 2,3-NAPHTHALENEDIOL

[75] Inventors: Domenic Santilli, Webster; Jeanne E. Kaeding; Louis J. Rossi, both of Rochester, all of N.Y.

[73] Assignee: Eastman Kodak Company, Rochester, N.Y.

[21] Appl. No.: 264,312

[22] Filed: May 18, 1981

[51] Int. Cl.³ .................. C09B 31/02; C09B 31/068; C09B 33/048; D06P 1/44
[52] U.S. Cl. ............................. 260/185; 260/174; 260/177; 260/178; 260/186; 260/191; 106/288 Q; 430/114; 564/86; 564/177
[58] Field of Search ............... 260/185, 174, 175, 177, 260/187, 191, 186

[56] References Cited

U.S. PATENT DOCUMENTS

| | | | |
|---|---|---|---|
| 603,903 | 4/1898 | Steinike et al. | 260/185 |
| 2,497,246 | 2/1950 | von Glahn | 260/186 |
| 3,077,042 | 2/1963 | Blout et al. | 260/185 X |
| 4,047,944 | 9/1977 | Rossi et al. | 96/1.2 |
| 4,145,299 | 3/1979 | Ford et al. | 252/62.1 L |
| 4,247,459 | 1/1981 | Ford et al. | 260/185 |

FOREIGN PATENT DOCUMENTS 82774  4/1893  Fed. Rep. of Germany ...... 260/186

Primary Examiner—Floyd D. Higel
Attorney, Agent, or Firm—William T. French

[57] ABSTRACT

Bis aryl-azo compounds of the formula

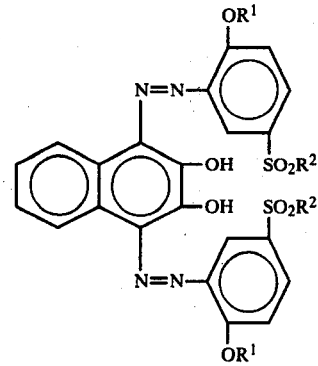

wherein $R^1$ is lower alkyl and $R^2$ is fluoro or amino. The compounds are useful as neutral density pigments in electrophotographic developers and have good light stability.

3 Claims, No Drawings

BIS ARYL-AZO DERIVATIVES OF 2,3-NAPHTHALENEDIOL

This invention relates to novel chemical compounds and to liquid electrophotographic developer compositions containing such compounds as colorants.

Electrophotographic developers are used for developing electrostatic charge patterns or, in other words, for making latent electrostatic images visible. For instance, in the electrophotographic copying of documents an electrostatic charge pattern is formed on a photoconductive surface and then is made visible with a developer composition or the charge pattern is transferred to a sheet of paper or other surface where it is then developed and made visible.

Both dry and liquid developer compositions are known. Liquid developers have certain advantages, such as small particle size, which permits their use in systems requiring fine line resolution. Liquid developers normally are composed of a finely divided pigment dispersed in an insulating carrier liquid such as a volatile hydrocarbon mixture. To bind the pigment to an imaging surface a binder resin can also be included in the dispersion. Other possible components include charge control agents which stabilize the colloidal dispersion by retarding the settling of the pigment from the carrier liquid.

Of the many colored substances that have been used as pigments for liquid developers, carbon black has been especially popular. Various black and colored organic compounds have also been used.

The patent to Ford et al. U.S. Pat. No. 4,145,299 discloses a class of organic compounds that are useful as pigments in liquid electrophotographic developers. These compounds are bis aryl-azo derivatives of 2,3-naphthalenediol. When dispersed, their optical density is substantially neutral; that is, they are black or nearly black in hue. They also form reasonably stable dispersions in hydrocarbon carrier liquids such as the commonly used isoparaffinic liquid carriers. Like many organic dyes, however, members of this class have poorer light stability than would be desired. Consequently, the images developed with them tend to fade when exposed to light or ultraviolet radiation over extended periods of time.

A need therefore exists for pigments having neutral density and good dispersion stability but also having good light stability. The compounds of the present invention supply this need. They form stable dispersions in carrier liquids; the images developed with them are of substantially neutral density; and these compounds also have good light stability.

The compounds of the invention are of the formula

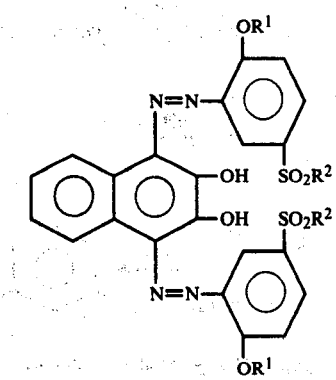

wherein $R^1$ is lower alkyl and, $R^2$ is —F or $$-N\begin{matrix}R^3\\R^4\end{matrix}, \text{ wherein } R^3 \text{ and } R^4 \text{ are hydrogen,}$$

wherein $R^3$ and $R^4$ are hydrogen, lower alkyl, phenyl, naphthyl, or lower alkylsubstituted phenyl or naphthyl and can be the same or different.

Although the compounds in which $R^1$ is methyl and $R^2$ is fluorine or amino are preferred, the compounds of the invention also include those in which $R^1$ and $R^2$ are other similar groups. These include, in the case of $R^1$, other lower alkyls such as ethyl, n-propyl and t-butyl. In the case of $R^2$ they include mono- and disubstituted amino groups such as methylamino, dimethylamino, methylethylamino, di-t-butylamino, diphenylamino, ditolylamino and naphthylamino.

The invention also includes an electrophotographic liquid developer comprising a dispersion of a pigment compound as defined above in an electrically insulating carrier liquid.

The compounds of the invention can be prepared by the known methods for preparing aromatic diazo compounds. A preferred method is to form a diazonium salt of an alkoxybenzene-sulfonamide which has an acetamido substituent and then to couple two moles of the diazonium salt with one mole of 2,3-naphthalenediol.

The examples which follow illustrate preparations of intermediates and of the desired final compounds.

EXAMPLE 1

(a) Preparation of o-Acetanisidide

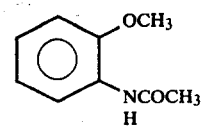

To 100 ml of acetic anhydride was added dropwise with stirring 100 g (0.813 mole) of o-anisidine, the temperature rising to about 60° C. during addition. The reaction mixture was heated on a steam bath for 15 minutes, allowed to cool to 45° C. and was poured onto 500 g of crushed ice. The white solid that precipitated was collected, washed free of acid with water and air dried to give 100 g, m.p. 84°–86° C., of product.

(b) Preparation of 3-Acetamido-4-methoxybenzenesulfonamide

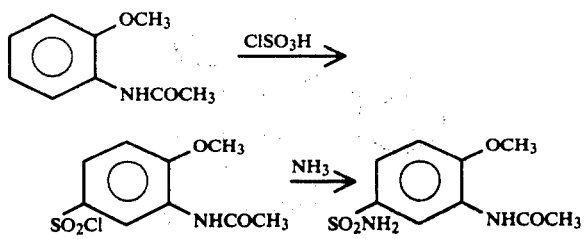

o-Acetanisidide (100 g, 0.605 mole) was added in portions to 200 ml of chlorosulfonic acid at about 50° C. (cooling is necessary). After the addition, the solution was heated at 50°-60° C. for four hours, cooled to room temperature and carefully added to an ice-water mixture (1.5 Kg). The white precipitate was collected, washed with an additional amount of water (1 liter) and pressed dry with a rubber dam for several hours. The damp sulfonyl chloride was dissolved in 500 ml of tetrahydrofuran, cooled to 0° C. and treated with a stream of ammonia gas (the temperature rising exothermically to about 25° C.) for 10 minutes. The white crystalline solid that separated was collected, washed with 100 ml of water and dried to give 114 g (80%) m.p. 227°-230° C., of sulfonamide.

(c) Preparation of 1,4-Bis(2-methoxy-5-sulfamoylphenylazo)-2,3-naphthalenediol

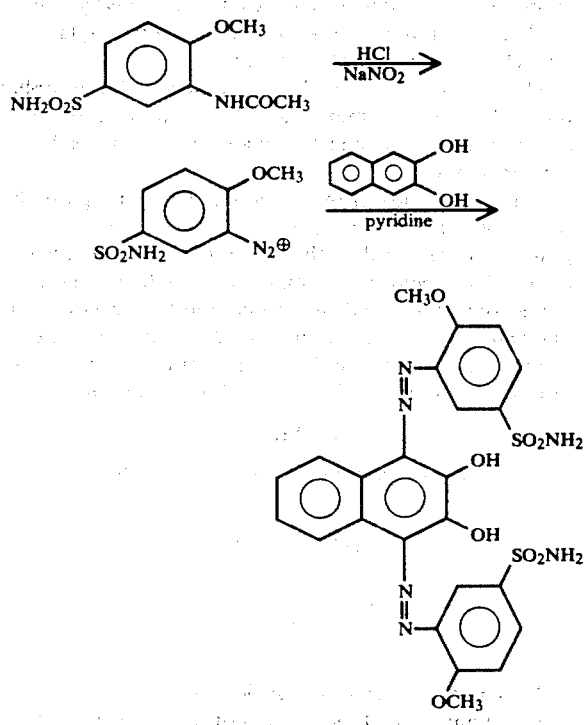

3-Acetamido-4-methoxybenzenesulfonamide (72.4 g, 0.297 mole) was suspended in 180 ml of 6 N hydrochloric acid and heated on a steam bath for 60 minutes. The amber solution was cooled to 0° C., the resulting slurry was treated with a solution of 21 g (0.30 mole) of sodium nitrite in 40 ml of water. After the addition, the solution was stirred for 15 minutes at 0° C. and then filtered to remove any insoluble material. The diazonium salt solution was then added dropwise at 0°-10° C. to a stirred solution of 22.0 g (0.142 mole) of 2,3-naphthalenediol in 900 ml of pyridine. The mixture was stirred for one hour at 0°-5° C. after addition was complete, then overnight without further cooling. The dark solid was collected, washed with 100 ml of pyridine, then 500 ml of methanol and finally warm water to give 71.8 g of crude product, m.p. about 345° C. (shrinks), after drying. This product was slurried in 500 ml of refluxing dimethylformamide solvent for 30 minutes. The dark mixture was cooled to room temperature, the solid was collected, washed with methanol until the filtrate was colorless and dried to give 62.8 g (76%) of product m.p. >400° C.

EXAMPLE 2

(a) Preparation of 3-Acetamido-4-methoxybenzenesulfonyl fluoride

To a solution of 33 g (0.35 mole) of potassium fluoride .2H$_2$O in 500 ml of dioxane/H$_2$O (1:1) was added an equimolar amount of 3-acetamido-4-methoxybenzenesulfonyl chloride prepared as in Example 1(b). The reaction mixture was refluxed for 90 minutes, then chilled in an ice-bath. The resulting white solid was collected and washed with water to give 61 g (72.5%) of the desired fluoride m.p. 162°-164° C.

(b) Preparation of 1,4-Bis(2-methoxy-5-fluorosulfonylphenylazo)2,3-naphthalenediol This compound was prepared in the manner described in Example 1(c), but substituting 8.9 g (0.036 mole) 3-acetamido-4-methoxybenzenesulfonyl fluoride for the acetamidosulfonamide of 1(b) and using corresponding amounts of the other materials. After washing and drying the amount of the desired compound was 4.3 g (35%), decomposing at 330° C. without melting.

The electrically insulating carrier liquid for the developer compositions of the invention is a liquid of a type known in the art. As is known, carrier liquids for electrophotographic developers should have a low dielectric constant and a very high electrical resistance. Suitable liquids have a dielectric constant less than 3 and a volume resistivity greater than about $10^{10}$ ohm-cm. They should also be stable under conditions of use. Examples of carrier liquids include hydrocarbon liquids such as the isoparaffinic hydrocarbons having a boiling range from 145° to 185° C. which are sold under the trademark "Isopar G." Others include halogenated hydrocarbon liquids boiling from 2° C. to 55° C., for example, fluorinated hydrocarbons, such as trichloromonofluoromethane and trichlorotrifluoroethane. Still other useful carrier liquids include polysiloxanes, odorless mineral spirits, octane and cyclohexane.

Although the developer can consist simply of a dispersion of a novel pigment of the invention in the carrier liquid, it is usually desirable to include a binder polymer to fix the pigment particles to the paper or film or other surface to be developed. Especially useful as binder polymers are the acrylic copolymers disclosed in Stahly et al. U.S. Pat. No. 3,849,165 and the polyesterionomers disclosed in Merrill et al. U.S. Pat. No. 4,202,785.

The liquid developer of the invention can also contain a charge control agent to provide uniform charge polarity on the developer particles and to aid in stabilizing the dispersion of pigment and binder resin. The charge control agent is also referred to as a stabilizer. The amount of charge control agent is preferably in the range from 0.1 to 2 weight percent of the developer composition. Examples of useful charge control agents or stabilizers are disclosed in Stahly et al., U.S. Pat. No. 3,849,165, Ford et al., U.S. Pat. No. 4,145,299, Merrill et al., U.S. Pat. No. 4,170,563 and Merrill et al., U.S. Pat. No. 4,229,513. Preferred polymeric charge control agents include poly(styrene-co-lauryl methacrylate-co-sulfoethyl methacrylate), poly(vinyltoluene-co-lauryl methacrylate-co-lithium methacrylate-co-methacrylic acid), poly(p-tert-butyl styrene-co-lithium methacrylate) and poly(vinyltoluene-co-lauryl methacrylate-co-methacryloyloxyethyltrimethylammonium-p-toluene sulfonate). They are either soluble or readily dispersible in the usual hydrocarbon carrier liquids and do not settle out. Non-polymeric charge control agents are also useful such as the soaps of magnesium and heavier metals disclosed in the patent to Beyer, U.S. Pat. No. 3,417,019.

The developer can be prepared as described in Ford et al. U.S. Pat. No. 4,145,299 by grinding or ball milling the pigment with a solution of the binder polymer in an aromatic hydrocarbon liquid to obtain a developer concentrate. This is then diluted with the insulating carrier liquid, such as an isoparaffinic hydrocarbon liquid, to obtain a dispersion of the pigment and binder polymer. The charge agent, if used, can be incorporated at the same time or later. The developer will contain from 0.01 to 1.0 gram of pigment per liter of developer. When a binder polymer is used the pigment to binder weight ratio can vary, e.g., from 1:20 to 2:1.

The following example illustrates the preparation of a developer of the invention.

EXAMPLE 3

To 22.5 g of a 7 weight percent solution of the stabilizer polymer, poly(vinyltoluene-co-lauryl methacrylate-co-lithium methacrylate-co-methacrylic acid), in "Solvesso 100" aromatic hydrocarbon solvent was added 2 g of the pigment of Example 1. ("Solvesso 100" is the trademark for an alkylated aromatic hydrocarbon mixture boiling from 150° to 185° C.). The mixture was ball-milled for 15 days to obtain a dispersion concentrate. To this concentrate was added 9.3 g of 14 weight percent solution of binder polymer in "Solvesso 100" aromatic hydrocarbon. The binder polymer was poly(ethyl acrylate-co-ethyl methacrylate-co-lauryl methacrylate-co-lithium sulfoethyl methacrylate). A quantity of the mixture (4.2 g) was then dispersed in 500 ml of "Isopar G" isoparaffinic carrier liquid by ultrasonic means.

EXAMPLE 4

In substantially the same manner as in Example 3 another developer of the invention was prepared but using a different pigment, namely, the pigment of Example 2.

Three other developers were prepared as in Example 3 but using instead of a pigment of the invention one of the following pigments:

CONTROL EXAMPLE 5

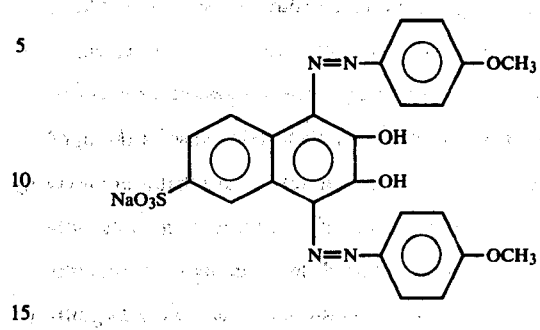

CONTROL EXAMPLE 6

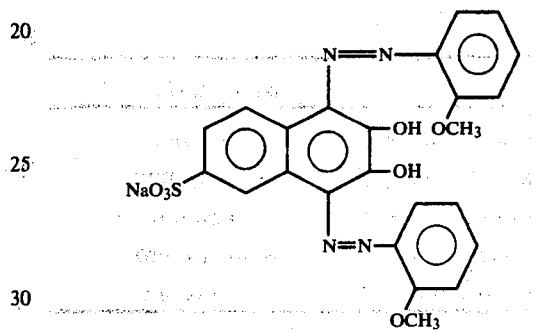

CONTROL EXAMPLE 7

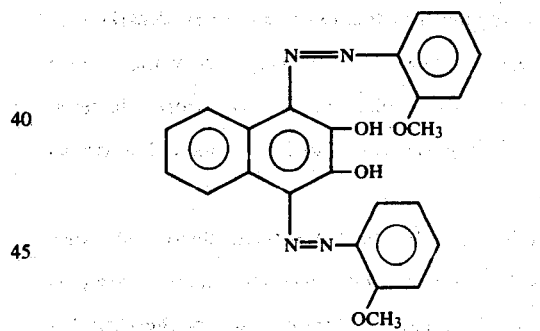

In each of the examples of the invention, Examples 3 and 4, and in the Control Examples 5-7 the pigments formed stable developer dispersions. Each developer was used to develop charge patterns formed by uniformly charging a polyethylene terephthalate film. In each instance the electrostatically charged film surface was successfully developed to a substantially black or neutral density. Each developed film sample was then subjected to a light fading test. The test consisted of exposure to high intensity, simulated northern skylight over a period of days. The results of the tests are reported in terms of High Intensity Daylight, which is a standard measure of light stability testing of images. This is abbreviated as HID and is equal to 50,000 lux. Thus an HID exposure for a period of one week (168 hours) is equal to $8.4 \times 10^6$ lux-hours. Assuming that the intensity of average northern skylight is 2500 lux, it can be calculated that one week of HID exposure is equivalent to 3,360 hours of northern daylight exposure, (8.4×10⁶ lux-hours/2500 lux=3,360 hours). At 12 hours of daylight per day, 280 days of average northern daylight are equivalent to one week of HID exposure. In addition to these assumptions, certain other assumptions are relevant to the results listed below for the light stability tests. The other assumptions are that there is no photographic reciprocity effect, there is no intermittency, the pigments tested have equivalent spectral energy distributions and in the tests there was no significant sensitivity to temperature or humidity changes.

The test results were as follows:

| Pigment | Percent Fading |
| --- | --- |
| Example 1 (Invention) | 7 at 7 days HID |
| Example 2 (Invention) | 6.5 at 7 days HID |
| Example 3 (Control) | 31 at 4 days HID |
| Example 4 (Control) | 40 at 4 days HID |
| Example 5 (Control) | 46 at 4 days HID |

The test results show that although all five pigments formed satisfactory dispersions and neutral density images, the pigments of the invention (Examples 1 and 2) were markedly superior to the pigments of the control examples in light stability or, in other words, in resistance to fading when exposed to simulated northern skylight.

In addition to the uses described above, the compounds of the invention can be components of composite electrically photosensitive particles of the type disclosed in Merrill et al., U.S. Ser. No. 064,972, filed Aug. 8, 1979, for use in photoelectrophoretic migration imaging processes.

Although the invention has been described in considerable detail with particular reference to certain preferred embodiments thereof, variations and modifications can be effected within the spirit and scope of the invention.

We claim:

1. A compound of the formula

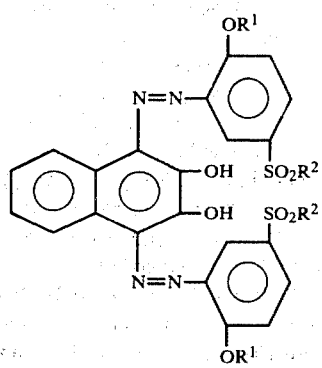

wherein R¹ is lower alkyl and R² is —F or

wherein R³ and R⁴ are hydrogen, lower alkyl, phenyl, naphthyl, or phenyl or naphthyl substituted by lower alkyl and are the same or different.

2. A compound according to claim 1 of the formula

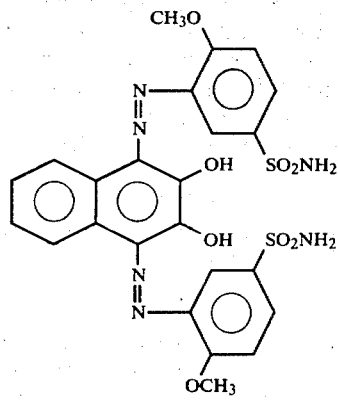

3. A compound according to claim 1 of the formula

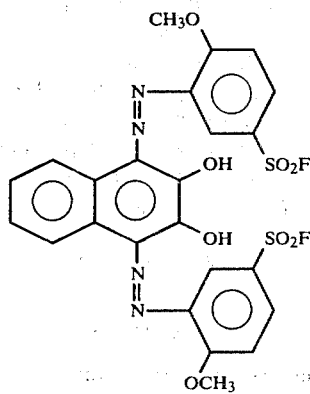

* * * * *